United States Patent [19]

Komiyama et al.

[11] Patent Number: 4,743,992
[45] Date of Patent: May 10, 1988

[54] MAGNETIC TAPE CASSETTE

[75] Inventors: Choji Komiyama; Kengo Oishi, both of Kanagawa, Japan

[73] Assignee: Fuji Photo Film Co., Ltd., Kanagawa, Japan

[21] Appl. No.: 769,648

[22] Filed: Aug. 27, 1985

[30] Foreign Application Priority Data

Aug. 27, 1984 [JP] Japan .................... 59-128637[U]

[51] Int. Cl.$^4$ .............................................. G11B 23/04
[52] U.S. Cl. ...................................... 360/132; 242/198
[58] Field of Search ................. 360/132; 242/197–200

[56] References Cited

U.S. PATENT DOCUMENTS

| 4,466,036 | 8/1984 | Ishida et al. | 360/132 |
| 4,541,581 | 9/1985 | Hara | 242/198 |
| 4,572,461 | 2/1986 | Horikawa et al. | 242/198 |
| 4,576,345 | 3/1986 | Koken et al. | 242/198 |
| 4,660,784 | 4/1987 | Sumida et al. | 360/132 |

FOREIGN PATENT DOCUMENTS

| 163293 | 12/1985 | European Pat. Off. | 360/132 |
| 57-147172 | 9/1982 | Japan | 360/132 |

Primary Examiner—John H. Wolff
Assistant Examiner—Matthew J. Bussan
Attorney, Agent, or Firm—Sughrue, Mion, Zinn, Macpeak, and Seas

[57] ABSTRACT

A magnetic tape cassette, particularly well adapted for high-density recording applications, in which the entry of dust and other contaminants is positively prevented. The cassette includes upper and lower half cases and a slide guard for closing an opening through which the tape can be extracted for recording and reproduction. The slide guard is in the form of a plate and is mounted so as to be slidable forwardly and backwardly of the cassette. A spring is provided to bias the slide guard towards the front end of the cassette. Protrusions are formed on the inner surface of the slide guard so as to be slidably in contact with the outer surface of the lower half case.

9 Claims, 2 Drawing Sheets

MAGNETIC TAPE CASSETTE

BACKGROUND OF THE INVENTION

The present invention relates to audio magnetic tape cassettes, and more particularly, to a compact cassette the same as or smaller in size than a standard "Phillips" type compact cassette.

Recently, cassette tape recorders have been reduced in size and in weight, and accordingly magnetic tape cassettes have been also miniaturized. Therefore, there has been a strong demand for the provision of small magnetic tape cassettes which are suitable for high-quality and high-density recording and reproducing operations. For instance, the magnetic tape cassette should be suitable for use in digital recording such as with PCM (pulse code modulation) whereby recording and reproducing operations are carried out with input signals converted into pulse signals. In such a system, the recording frequency bandwidth must be about five times as wide as the maximum bandwidth of a conventional audio tape intended for analog recording. Therefore, video tape cassettes, which are considerably larger in size than audio compact cassettes, have been extensively employed for such purposes.

Video tape cassettes (except for special cases) are intended for use with a rotary head system. These video tape cassettes have guard panels which close openings formed in the front parts of the cassettes and are swingable upwardly for recording and playing back. That is, in video and digital systems because the recording and reproducing operations are carried out using higher recording densities and wider bandwidths than is possible with a conventional audio compact cassette, and because the tape is therefore more sensitive to contamination, it is necessary to more positively prevent the entrance of dust and the like into the cassette to protect the magnetic tape from damage.

The technical concept of the invention is applied to a very small magnetic tape cassette which, similar to the above-described video tape cassette, employs a relatively wide frequency bandwidth recording and reproducing system, and which is applicable to audio devices, and is the same as or smaller in size than the conventional audio compact cassette. Specifically, so that the cassette can be used outdoors and carried without a storage casing, the magnetic tape cassette must have better dust protection than a conventional video tape cassette.

A variety of digital audio tape magnetic tape cassettes have been proposed. Such magnetic tape cassettes generally include a guard panel which is swung upwardly, similar to the above-described video tape cassette, and a slide guard which is slid along the bottom of the cassette in a direction perpendicular to the longitudinal direction of the cassette, thereby to close the lower part of an opening formed in the front part of the cassette to receive the tape drawing mechanism of the magnetic tape recording and reproducing device.

As is apparent from the above description, it is desirable that the above-described digital audio type magnetic tape cassette having the guard panel and the slide guard provide more positive protection of the magnetic tape, namely, a more positive dust-proofing action than the conventional video tape cassette. Especially, there has been a demand for a magnetic tape cassette whose slide guard is more smoothly operable.

SUMMARY OF THE INVENTION

In view of the foregoing, an object of the invention is to provide a magnetic tape cassette which is more effective in preventing the entrance of dust and in protecting the magnetic tape, and which has a slide guard which operates easily and positively.

The foregoing object and other objects of the invention have been achieved by the provision of a magnetic tape cassette comprising: a pair of hubs on which a magnetic tape is wound, friction sheets, a locking member for locking the hubs, means defining an opening through which the magnetic tape is pulled out of the cassette, a guard panel and a slide guard for closing the opening, and upper and lower half cases, in which, according to the invention, the slide guard is in the form of a plate and is urged towards the front end of the cassette so that the slide guard can be slid forwardly and backwardly of the cassette, and protrusions are formed on the inner surface of the slide guard which are slidably in contact with the outer surface of the lower half case.

DESCRIPTION OF THE PREFERRED EMBODIMENTS

The invention will now be described in detail with reference to preferred embodiments shown in the accompanying drawings.

Figure 1:
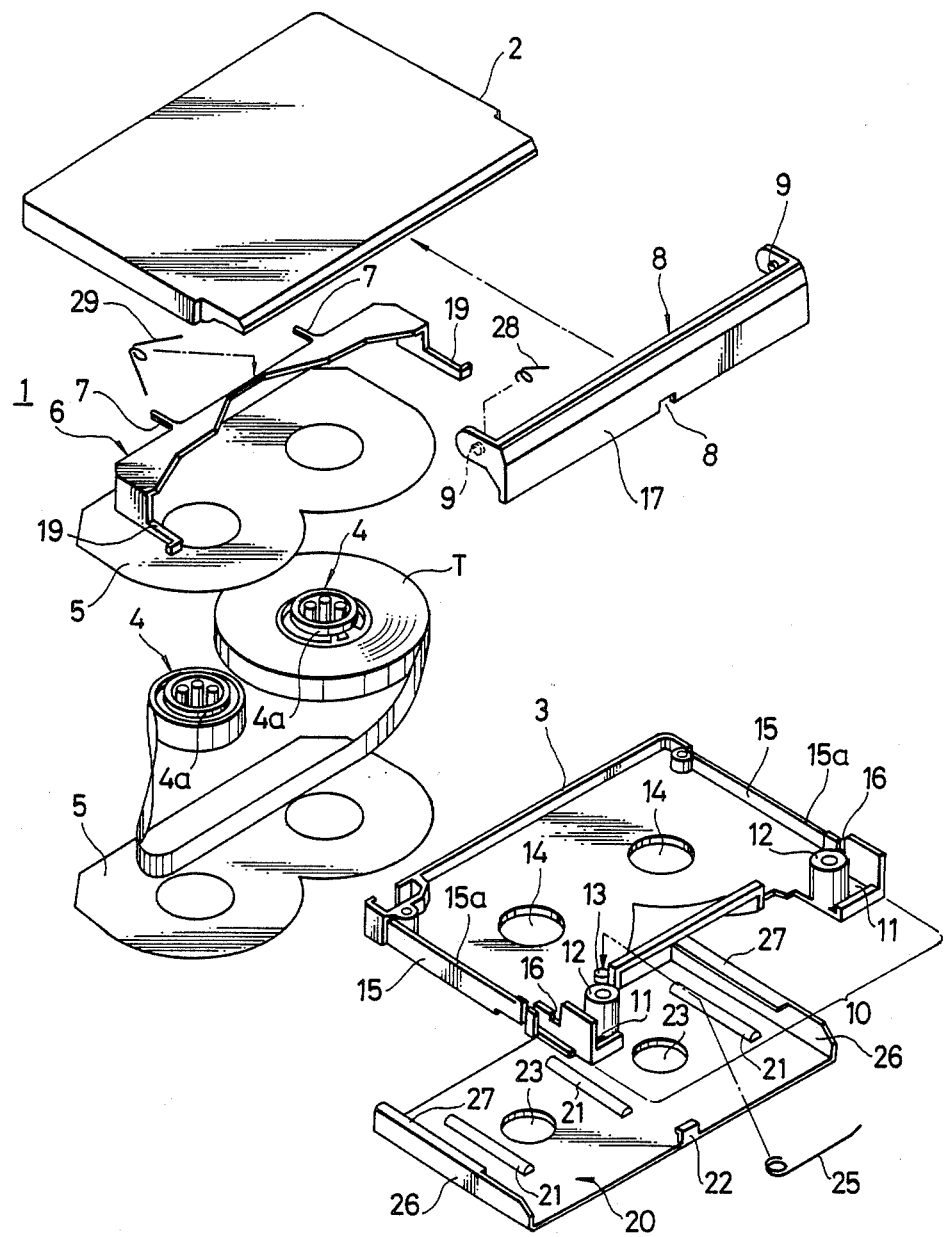
FIG. 1 is an exploded perspective view showing one embodiment of the invention.

FIG. 1 shows a magnetic tape cassette the same as or smaller in size than a conventional compact audio cassette. The cassette 1 includes a cassette case composed of upper and lower half cases 2 and 3. The cassette also includes a pair of hubs 4 on which a magnetic tape T is wound, friction sheets 5 for allowing the hubs 4 to smoothly rotate, and a locking member 6 for preventing unwanted rotation of the hubs 4. The cassette further includes a guard panel 8 used to close the front part of an opening 10 formed in the front wall of the cassette case, and a slide guide 20 which closes the lower part of the opening 10.

The hubs 4 have peripheral edges 4a which protrude coaxially with their tape winding walls so that they can engage with engaging parts 7 of the locking member 6.

The guard panel 8 is substantially U shaped in horizontal section, similar to a conventional video tape cassette. Its right and left end pieces have respective rotary supporting shafts 9 which protrude towards each other. In assembling the cassette, the rotary supporting shafts 9 of the guard panel 8 are rotatably engaged with holes 16 formed when the upper and lower half cases 2 and 3 are joined together, or holes (not shown) formed in one of the upper and lower half cases 2 and 3. The guard panel 8 is urged by a spring 28 to close the opening 10.

The guard panel 8 has a cut 18 at the center of the lower edge of its front wall 17. The cut forms an index for correctly loading the magnetic tape cassette 1 in a magnetic tape recording and reproducing device. That is, when an erroneous-insertion-preventing protrusion, provided in the cassette loading section of the recording and reproducing device, meets the cut 18, the magnetic tape cassette can be correctly loaded in the recording and reproducing device.

As in the conventional video tape cassette, the lower half case 3 has a pair of reel shaft inserting holes 14 in correspondence to the hubs 4, and has tape drawing openings 11 at both ends of the aforementioned opening 10 through which the magnetic tape T can be pulled out of the cassette. The cassette bottom is formed so that the part thereof between the tape drawing openings 11 is recessed towards the rear end of the cassette. In other words, it is so formed that, when the magnetic tape cassette 1 is loaded in the magnetic recording and reproducing device, the tape drawing member of the latter can pass into the cassette from below.

Steps 15a are formed on the upper edges of the side walls 15 of the lower half case 3 so that slits extending along the side walls are formed when the cassette is assembled.

The slide guard 20 is substantially plate shaped. The slide guard is bent at right angles to provide side pieces 26 at both ends which extend along the respective cassette case side walls 15. That is, the slide guard is substantially U shaped in vertical section.

The upper edge of each of the side pieces 26 is slightly extended inwardly of the cassette case to form overhangs 27. Three protrusions 21 are formed on the inner surface of the slide guard which confront the outer surface of the lower half case 3 in such a manner that two of the protrusions are positioned near the side pieces 26 and the remaining one is located between the two protrusions, and the three protrusions extend in the longitudinal direction of the side pieces 26. Furthermore, through-holes 23 are formed in the slide guide 20 in such a manner as to coincide with the reel shaft inserting holes 14, and an engaging protrusion 22 is formed on the inner surface of the slide guide 20. The engaging protrusion 22 is engaged with a slide guide spring 25 which urges the slide guide 20 towards the front end of the cassette.

The three protrusions 21 are equal in height, and are, for instance, semicircular in cross section. The engaging protrusion 22 is designed so that it is received by the cut 18 formed in the guard panel 8 and meets the erroneous-insertion preventing protrusion of the magnetic tape recording and reproducing device.

The front part of the upper half case 2 is designed so that, as in a conventional video tape cassette, when it is combined with the lower half case, the aforementioned tape drawing openings 11 are formed. An arrangement (not shown) for regulating the rotational positions of the hubs is provided on the upper surface of the upper half case 2.

Figure 2:
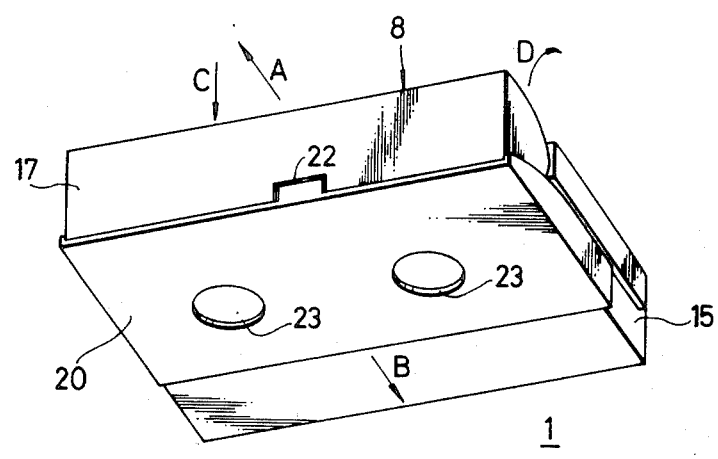
FIG. 2 is a perspective view showing a magnetic tape cassette obtained by assembling various components in FIG. 1.

The magnetic tape cassette 1 is assembled as follows: First, the slide guard 20 is mounted on the outer surface of the lower half case 3. In this case, the overhangs 27 move inside the cassette from above the upper edges of the steps 15a of the lower half case 3. In other words, the lower half case 3 is pushed into the slide guard from above, as shown in FIG. 2, so that the side pieces 26 of the slide guard 20 are opened outwardly and the overhangs 27 move inside the cassette.

One end of the slide guard spring 25 is fastened to a locking pin 13 on the lower half case 3 while the other end is engaged with the engaging protrusion 22 so that the slide guard 20, being urged towards the front end of the cassette, is made slidable in the longitudinal direction of the side pieces 26. Thereafter, the hubs 4 on which the magnetic tape T has been wound are placed on the friction sheet 5 over the inner surface of the lower half case in such a manner that they are in alignment with respective ones of the reel shaft inserting holes 14. Then, the magnetic tape T is partially pulled out of the cassette through the tape drawing openings 11 and is laid over right and left tape guides 12. In this condition, another friction sheet 5 is placed over the hubs, and then the locking member 6 is arranged on the friction sheet 5. In this case, the locking member 6 is arranged so that it, being urged towards the rear end of the cassette by a locking member spring 29, can slide back and forth. When the upper half case 2 is combined with the lower half case 3, the rotary supporting shafts 9 of the guard panel 8 are rotatably engaged with respective ones of the holes 16, and the guard panel 8 is urged by the guard panel spring 28 so as to close the opening.

After the upper half case 2 is placed on the lower half case 3 as described above, the cases 2 and 3 are joined tightly with screws or the like.

When the magnetic tape cassette 1 is in storage (not in use), the guard panel 8 and the slide guard 20 close the opening 10, and the peripheral edges 4a of the hubs 4 are abutted against the engaging parts 7 of the locking member 6 so that rotation of the hubs 4 is prevented.

The upper and lower half cases 2 and 3, the guard panel 8, and the locking member 6 may be made of a plastic resin such as polyacetal resin, ABS resin or PS resin, as in a conventional cassette. The slide guard 20 may be made of a metal such as stainless steel. However, it is preferable that it be made of plastic resin due to the lower manufacturing cost.

The magnetic tape T may be a ferromagnetic iron oxide or chromium dioxide tape, but it is preferable to employ a magnetic tape such as metal tape or vacuum deposited tape which is suitable for high density recording and reproducing operations.

When the magnetic tape cassette 1 is loaded in or unloaded from the magnetic tape recording and reproducing device, its various parts operate as follows:

In order to load the magnetic tape cassette 1 into the cassette inserting section of the recording and reproducing device, the cassette 1 is inserted with its opening 10 held forwardly (in the direction of the arrow A in FIG. 2). In this operation, the engaging protrusion 22 of the slide guard 20 is abutted against the erroneous-insertion-preventing protrusion in the cassette inserting section so that the slide guard is slid towards the rear end of the cassette (in the direction of the arrow B). As a result, the lower part of the opening 10 is opened, while the through-holes 23 are aligned with the respective reel shaft inserting holes 14 so as to be ready for receiving the hub driving reel shafts.

Thereafter, the magnetic tape cassette 1 is moved in a direction perpendicular to the direction of insertion, namely, downwardly (in the direction of the arrow C). In this operation, the lower edge of the guard panel is abutted against the guard panel opening device provided at the inner part of the cassette inserting section so that the guard panel is swung upwardly (in the direction of the arrow D) with the rotary supporting shafts 9 acting as a rotational axis.

As the guard panel 8 is opened, the right and left end pieces of the guard panel 8 engage the end portions of the right and left extended pieces 19 of the locking member 6 to slide the latter towards the front end of the cassette. As a result, the hubs 4 are disengaged from the locking parts 7 of the locking member 6 so that the hubs 4 can be rotated.

When the loading of the magnetic tape cassette 1 has been accomplished by inserting it and by moving it downwardly, and the opening 10 has been completely opened by sliding the slide guard 20 and by swinging the guard panel 8, the peripheral edges 4a are disengaged from the engaging parts 7. As a result, the magnetic tape T can be partially pulled out of the cassette, while the hubs 4 can be turned. Then, recording and reproducing operations can be carried out as desired.

In unloading the magnetic tape cassette 1 from the magnetic tape recording and reproducing device, the above-described operations are carried out in the reverse order. First, the guard panel 8 is disengaged from the guard panel opening 10 with the aid of the guard panel spring 28. As the magnetic tape cassette 1 is pulled out, the slide guard 20 is disengaged from the erroneous-insertion-preventing protrusion so that it is slid towards the front end of the cassette with the aid of the slide guard spring 25. As a result, the opening 10 is completely closed.

As the guard panel 8 swings to close the opening 10, the right and left end piece of the guard panel 8 are disengaged from the ends of the extended pieces 19 of the locking member 6. As a result, the locking member 6 is slid towards the rear end of the cassette by the locking spring 29 so that the locking parts 7 are engaged with the peripheral edges 4a, thus locking the hubs 4. As the slide guard 20 slides to close the lower part of the opening 10, the reel shaft inserting holes 14, being displaced from the through-holes 23, are closed.

In the above-described sliding operation of the slide guard, the frictional resistance is considerably small because the protrusions 21 formed on the inner surface of the slide guard 20 are in line contact with the outer surface of the lower half case 3.

In the above-described embodiment, the three protrusions 21 having a suitable length are formed on the inner surface of the slide guard extending in the front-to-rear inner surface of the slide guard extending in the front-to-rear direction of the cassette. However, it should be noted that the invention is not limited thereto or thereby. For instance, a plurality of semi-spherical protrusions may be formed on the inner surface of the slide guide 20 suitably distributed over the inner surface.

In the above-described embodiment, the engaging protrusion 22 to which the slide guard spring 25 is fastened is utilized to move the slide guard 20 towards the rear end of the cassette. However, it should be noted that the invention is not limited thereto or thereby. For instance, the cassette may be modified by forming protrusions at both ends of the front part of the slide guard 20 while cuts for receiving the protrusions are formed in the guard panel 8 so that erroneous-insertion preventing protrusions engaging with the protrusions of the slide guide 20 are utilized to move the latter.

As is apparent from the above description, when the magnetic tape cassette of the invention is in storage (not in use), the opening 10 is maintained completely closed by the guard panel 8 and the slide guard 20, and the reel shaft inserting holes 14 are also closed by the slide guard 20. Therefore, the magnetic tape T in the cassette is satisfactorily protected from damage and dust. Accordingly, the cassette is considerably effective in maintaining the recording and reproducing characteristics of the magnetic tape.

According to the invention, the protrusions 21 are formed on the slide guard 20 to decrease the contact area of the slide guard 20 and the lower half case 3, which improves the slidability of the slide guard 20. For instance, even if the slide guard 20 is warped during molding or it warps over time, its sliding operation is barely affected. As the protrusions 21 are formed on the slide guard as described above, it is not always necessary that the inner surface of the slide guard 20 and the outer surface of the lower half case 3 be excellent in flatness, which contributes to a reduction of the manufacturing cost of the magnetic tape cassette.

It has been stated that the technical concept of the invention is applied to a digital audio magnetic tape cassette whose size is equal to or smaller than a conventional compact cassette ("Phillips" type). However, it should be noted that the invention is not limited thereto or thereby. That is, the technical concept of the invention is applicable to conventional video tape cassette and other magnetic tape cassettes.

What is claimed is:

1. A magnetic tape cassette comprising: a pair of hubs (4) on which a magnetic tape (T) is wound, said wound magnetic tape having substantially planar first and second surfaces, first and second planar friction sheets (5) disposed within the cassette in individual contact with the first and second substantially planar surfaces of said wound magnetic tape, respectively, a displaceable locking member (6) for locking said hubs against rotation, first and second rectangular case halves (2, 3) secured together and sandwiching the hubs, magnetic tape, friction sheets and locking member therebetween, said first and second case halves defining a cassette housing having three closed sides and one open side (10) to enable access to said magnetic tape, a recess defined in said lower case half contiguous with said open side of said housing, an elongate guard panel (8) pivotally mounted to said housing for closing said open side thereof, and a rectangular slide guard (20) slidably mounted to said second case half for movement towards and away from said open housing side between a first position whereat said lower case half recess is closed and a second position whereat said recess is openly exposed, spring means (25) for urging said slide guard towards said first position, and a plurality of spaced protrusions (21), upstanding from an inner surface of a main, base portion of said slide guard and in slidable engagement with a surface of said second half case which faces away from said first half case, for reducing sliding friction between said slide guard and said second case half.

2. The magnetic tape cassette of claim 1, wherein said protrusions are elongated ridges extending perpendicular to said open side of said housing.

3. The magnetic tape cassette of claim 1, wherein said protrusions are semi-spherical in shape.

4. A magnetic tape cassette comprising: first and second hubs (4) on which a magnetic tape (T) is wound, a housing, said housing comprising first and second cassette half cases (3,2), said first cassette half case (3) having a base, said base having first and second holes formed therein, means for securing said cases to one another, means defining first and second contiguous openings (10) through which said magnetic tape can be pulled out of said housing, said first opening being formed in said base of said first cassette half case, and means for rotatably supporting said first and second hubs in alignment with said first and second holes, a slide guard (20), said slide guard having a base plate, said base plate having first and second apertures (23) formed therein, said slide guard being slidable to a first position where said first and second apertures are aligned with said first and second holes, respectively, in said base of said first cassette half, and said slide guard being slidable to a second position for covering said first opening, and means for slidably attaching said slide guard to said housing with a surface of said base plate of said slide guard facing a main surface of said base, and said slide guard having projections (21), formed on said surface of said base plate, for slidably contacting said main surface of said base to reduce the surface area of said base plate which is in contact with said main surface of said base.

5. The magnetic tape cassette of claim 4, further comprising means (25), attached to said housing, for biasing said slide guard in said first position.

6. The magnetic tape cassette of claim 4, further comprising first and second friction sheets (5) disposed in contact with first and second portions of said magnetic tape which face in said first and second directions, respectively.

7. The magnetic tape cassette of claim 6, said tape cassette further comprising locking means (6) movable to a first position for preventing said hubs from rotating, and said housing further comprising means for movably supporting said locking means within said housing.

8. The magnetic tape cassette of claim 7, wherein said housing further comprises means, including said recessed portion of said base of said first cassette half case, defining an opening through which the magnetic tape can be pulled out of said cassette, and said tape cassette further comprises a guard panel (8) for covering the opening except at said recessed portion, and means for rotatably attaching said guard panel to said second cassette half case.

9. The magnetic tape cassette of claim 4, wherein said protrusions extend in said third direction.

* * * * *